(12) United States Patent
Tsai et al.

(10) Patent No.: US 12,481,936 B1
(45) Date of Patent: Nov. 25, 2025

(54) SUPPLY CHAIN ROUTE MODELING WITH UNMANNED AERIAL VEHICLE SEGMENTS

(71) Applicant: COUPA SOFTWARE INCORPORATED, San Mateo, CA (US)

(72) Inventors: Chien-Yi Tsai, Ann Arbor, MI (US); Mohd Hafiz Bin Hasan, Ann Arbor, MI (US)

(73) Assignee: Coupa Software Incorporated, Foster City, CA (US)

( * ) Notice: Subject to any disclaimer, the term of this patent is extended or adjusted under 35 U.S.C. 154(b) by 224 days.

(21) Appl. No.: 18/469,816

(22) Filed: Sep. 19, 2023

(51) Int. Cl.
*G06Q 10/047* (2023.01)
*G06Q 10/083* (2024.01)
*G08G 5/34* (2025.01)

(52) U.S. Cl.
CPC ......... *G06Q 10/047* (2013.01); *G06Q 10/083* (2013.01); *G08G 5/34* (2025.01)

(58) Field of Classification Search
CPC ....... G06Q 10/047; G06Q 10/083; G08G 5/34
See application file for complete search history.

(56) References Cited

U.S. PATENT DOCUMENTS

2015/0336668 A1* 11/2015 Pasko .................. G05D 1/0005
701/2
2015/0370251 A1* 12/2015 Siegel ....................... B64D 1/22
701/2

(Continued)

OTHER PUBLICATIONS

Solomasov, Alexey, "Analysis of supply chain operational performances using vehicle routing with UAV delivery in city logistics" Université de Liège, Liège, Belgique, http://hdl.handle.net/2268.2/8463, Sep. 3, 2019/Sep. 10, 2019, 78 pages.

(Continued)

*Primary Examiner* — Jason Holloway
*Assistant Examiner* — Madison B Emmett
(74) *Attorney, Agent, or Firm* — Baker Botts L.L.P.

(57) ABSTRACT

In an embodiment, a system disclosed herein receives input information relating to an unmanned aerial vehicle, ground delivery assets, and user preferences or configurations for delivery routes. The system processes the inputted information and determines an optimized delivery route that utilizes the unmanned aerial vehicle and the ground delivery assets. In an embodiment, a computer-implemented method, comprises accessing a drone definition table and a drone assignment table of a database system; accessing digitally stored delivery route data specifying a plurality of nodes connected by edges, the nodes being ordered from a starting point to a last node, wherein each of the nodes represents a delivery location, wherein each of the nodes comprises a service attribute specifying ground-only delivery or ground/drone delivery; selecting, from the delivery route data, a particular node having the service attribute specifying ground/drone delivery and that is next in order with respect to the starting point; removing the particular node from the delivery route data; determining a drone flight time associated with a distance, from a preceding node to a subsequent node, with respect to the particular node; based on the drone definition table and the drone assignment table, determining whether the drone flight time exceeds a maximum drone flight time of a particular drone; in response to determining that the drone flight time exceeds the maximum drone flight time, restoring the particular node in the delivery route data; and, otherwise, writing, to one or more sortie tables in the database, one or more sortie records corresponding to a sortie of the particular drone that can occur between the preceding node and the subsequent node; repeating the selecting, removing, determining, restoring, and writing steps for a plurality of other particular nodes in the delivery route data having the service attribute specifying ground/drone delivery.

17 Claims, 5 Drawing Sheets

(56) References Cited

U.S. PATENT DOCUMENTS

| | | | | |
|---|---|---|---|---|
| 2016/0114888 A1* | 4/2016 | Downey | ................ | B64D 47/00 |
| | | | | 701/2 |
| 2016/0299233 A1* | 10/2016 | Levien | ..................... | G08G 5/53 |
| 2018/0074520 A1* | 3/2018 | Liu | .......................... | G08G 5/25 |
| 2018/0164807 A1* | 6/2018 | Kuhara | ..................... | G01S 5/00 |
| 2018/0356823 A1* | 12/2018 | Cooper | ................. | G06Q 50/40 |
| 2019/0033467 A1* | 1/2019 | Moore | .................... | G01S 19/51 |
| 2019/0043000 A1* | 2/2019 | Wang | ...................... | B60L 53/30 |
| 2019/0114929 A1* | 4/2019 | Sasaki | ................... | B64U 50/19 |
| 2019/0220819 A1* | 7/2019 | Banvait | ............ | G06Q 10/08355 |
| 2020/0184836 A1* | 6/2020 | Yang | ...................... | G08G 5/723 |
| 2021/0041241 A1* | 2/2021 | Mitra | ................. | G01C 21/3617 |
| 2021/0300552 A1* | 9/2021 | Isberg | .................... | G06Q 10/08 |
| 2021/0374655 A1* | 12/2021 | Sweeney | ................ | B64U 80/25 |
| 2022/0230547 A1* | 7/2022 | Miller | ...................... | G08G 5/32 |
| 2024/0133693 A1* | 4/2024 | Ali | .......................... | G08G 5/55 |

OTHER PUBLICATIONS

Abderahman Rejeb et al., "Drones for supply chain management and logistics: a review and research agenda," May 2023, International Journal of Logistics Research and Applications, 26 pages.

Kristina Marintseva et al., "Delivery of Special Cargoes Using the Unmanned Aerial Vehicles," IGI Global, A volume in the Advances in Logistics, Operations, and Management Science (ALOMS) Book Series, http://hdl.handle.net/2268.2/8463, Jan. 2019, 34 pages, In book: Unmanned Aerial Vehicles in Civilian Logistics and Supply Chain Management (pp. 33-63).

\* cited by examiner

SUPPLY CHAIN ROUTE MODELING WITH UNMANNED AERIAL VEHICLE SEGMENTS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright or rights. © 2023 Coupa Software Incorporated.

TECHNICAL FIELD

One technical field of the present disclosure is supply chain route optimization or delivery route optimization. Another technical field is route optimization for delivery routes that use unmanned aerial vehicles.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

In recent years, unmanned aerial vehicles have rapidly transitioned from niche technology to a ubiquitous presence across various industries. Fueled by advancements in miniaturization, affordability, and technological capabilities, drones have become increasingly common tools for applications ranging from aerial photography and videography to environmental monitoring, infrastructure inspection, agriculture, search and rescue, and even package delivery. The ease of piloting and the availability of user-friendly consumer models have further democratized drone usage, fostering a widespread adoption that continues to reshape industries and revolutionize how tasks are accomplished from the skies.

Unmanned aerial vehicles, such as drones, may take on many different configurations. An example drone may include a multi-propeller helicopter configuration or an airplane configuration. Drones may be utilized for their ability to take off and land in small spaces. Drones may also be capable of carrying small amounts of cargo and may provide remote sensor information. As the regulation of flying drones becomes more defined, drones are likely to have an increased role in society and commerce.

Coordinating the delivery of physical goods using both drones and trucks presents a complex logistical challenge due to the integration of two distinct transportation modes. While drones offer speed and direct access to remote or congested areas, their limited payload capacity, and range can hinder their efficiency and reliability for large-scale or long-distance deliveries. Trucks, on the other hand, excel in transporting larger volumes over extended distances but are constrained by road infrastructure, traffic congestion, and last-mile accessibility. Successfully harmonizing these two modes requires intricate routing algorithms and infrastructure investment, highlighting the intricate difficulties in achieving seamless and efficient combined drone and truck delivery systems.

Based on the foregoing, the referenced technical fields have developed an acute need for better ways to optimize the routing algorithms that can leverage the benefits provided by combined drone and truck delivery.

SUMMARY

The appended claims may serve as a summary of the invention.

DETAILED DESCRIPTION

Figure 1:
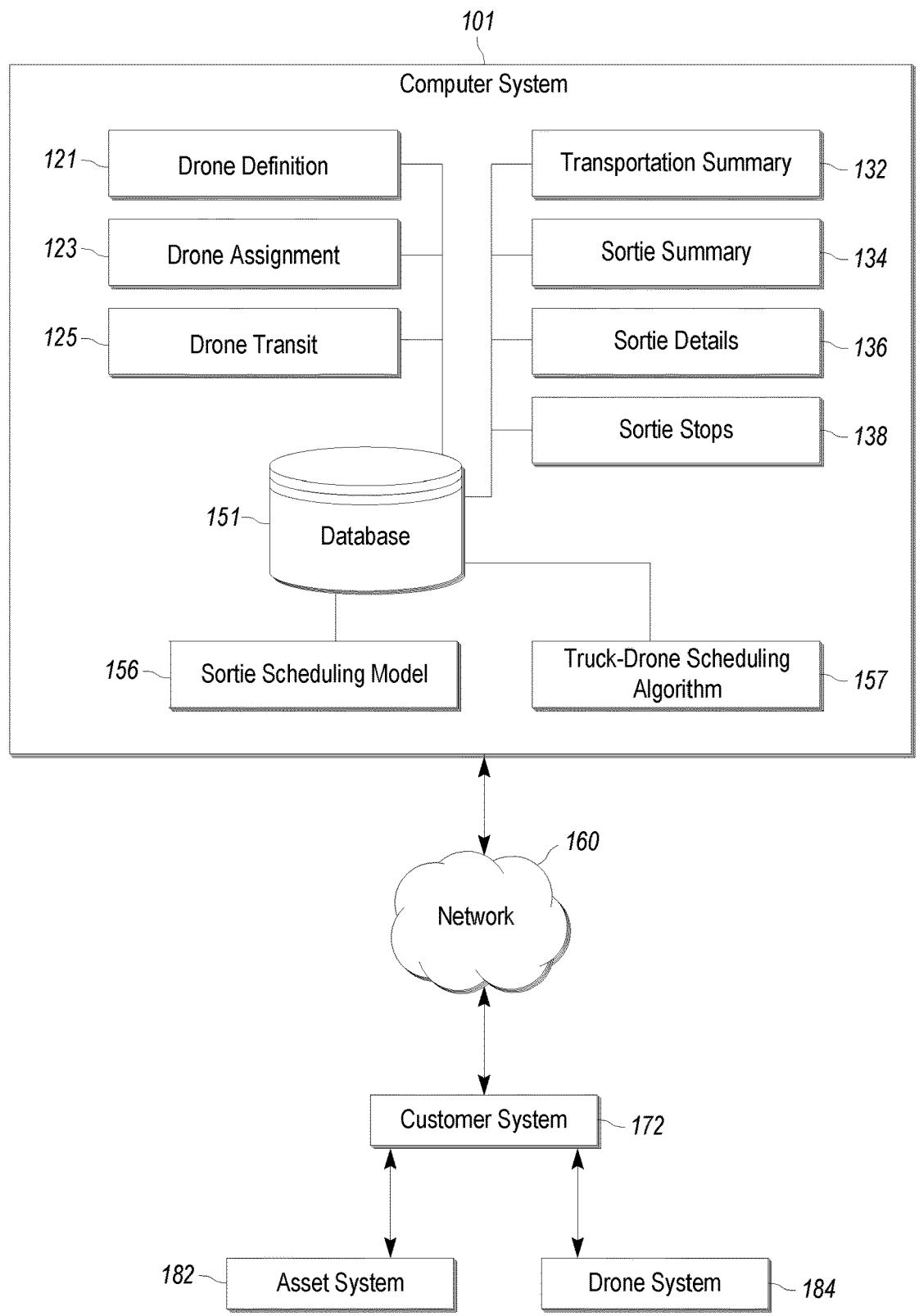
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

This disclosure may describe one or more different inventions, with alternative embodiments to illustrate examples. Other embodiments may be utilized, and structural, logical, software, electrical, and other changes may be made without departing from the scope of the particular inventions. Various modifications and alterations are possible and expected. Some features of one or more of the inventions may be described with reference to one or more particular embodiments or drawing figures, but such features are not limited to usage in the one or more particular embodiments or figures with reference to which they are described. Thus, the present disclosure is neither a literal description of all embodiments of one or more inventions nor a listing of features of one or more inventions that must be present in all embodiments.

Headings of sections and the title are provided for convenience but are not intended to limit the disclosure in any way or as a basis for interpreting the claims. Devices described as in communication with each other need not be in continuous communication with each other unless expressly specified otherwise. In addition, devices that communicate with each other may communicate directly or indirectly through one or more intermediaries, logical or physical.

A description of an embodiment with several components in communication with one other does not imply that all such components are required. Optional components may be described to illustrate a variety of possible embodiments and to illustrate one or more aspects of the inventions fully. Similarly, although process steps, method steps, algorithms, or the like may be described in sequential order, such processes, methods, and algorithms may generally be configured to work in different orders unless specifically stated to the contrary. Any sequence or order of steps described in this disclosure is not a required sequence or order. The steps of the described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment but need not occur only once. Some steps may be omitted in some embodiments or occurrences, or some steps may be executed more than once in a given embodiment or occurrence. When a single device or article is described, more than one device or article may be used in place of a single device or article. Where more than one device or article is described, a single device or article may be used instead of more than one device or article.

The functionality or features of a device may be alternatively embodied by one or more other devices that are not explicitly described as having such functionality or features. Thus, other embodiments of one or more inventions need not include the device itself. Techniques and mechanisms described or referenced herein will sometimes be described in singular form for clarity. However, it should be noted that particular embodiments include multiple iterations of a technique or manifestations of a mechanism unless noted otherwise. Process descriptions or blocks in figures should be understood as representing modules, segments, or portions of code, including one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

1. General Overview

Embodiments disclosed herein are directed to a system that can receive as input information relating to an unmanned aerial vehicle, ground delivery assets, and user preferences or configurations for delivery routes. The system is programmed to process the inputted information and determine an optimized delivery route that utilizes the unmanned aerial vehicle and the ground delivery assets. An unmanned aerial vehicle referred to herein may also be referred to as a drone. A ground delivery asset referred to herein may also be referred to as a truck, van, carrier, or asset. In particular embodiments, one or more drones may be configured to be launched and retrieved from, or near the vicinity, of an asset. The drones may also be transported from one location to another on an asset during which the drone's battery may be recharged, replaced, and/or placed in a stand-by mode or turned-off mode.

In particular embodiments, the systems disclosed herein may be programmed to determine where and how to incorporate drones into the logistics operations to improve last-mile delivery and reduce cost.

In an embodiment, a computer system comprises a database system programmed according to a table schema and storing a drone definition table that digitally stores records that define a plurality of attributes of a plurality of drones and a drone assignment table that digitally stores records that associate one or more of the drones identified in the drone definition table with one or more transportation assets. The computer system may further comprise one or more processors that are communicatively coupled to the database system, and one or more non-transitory computer-readable storage media that are communicatively coupled to the one or more processors storing one or more sequences of instructions. The one or more sequences of instructions, when executed using the one or more processors, cause the one or more processors to execute accessing, selecting, and/or reading the drone definition table and the drone assignment table of the database system; accessing digitally stored delivery route data specifying a plurality of nodes connected by edges, the nodes being ordered from a starting point to a last node, wherein each of the nodes represents a delivery location, wherein each of the nodes comprises a service attribute specifying ground-only delivery or ground and drone delivery; selecting, from the delivery route data, a particular node having the service attribute specifying ground and drone delivery and that is next in order with respect to the starting point; removing the particular node from the delivery route data; determining a drone flight time associated with a distance, from a preceding node to a subsequent node, with respect to the particular node; based on the drone definition table and the drone assignment table, determining whether the drone flight time exceeds a maximum drone flight time of a particular drone; in response to determining that the drone flight time exceeds the maximum drone flight time, restoring the particular node in the delivery route data; and, otherwise, writing, to one or more sortie tables in the database, one or more sortie records corresponding to a sortie of the particular drone that can occur between the preceding node and the subsequent node; repeating the selecting, removing, determining, restoring, and writing steps for a plurality of other particular nodes in the delivery route data having the service attribute specifying ground and drone delivery.

In an embodiment, the one or more sequences of instructions which, when executed using one or more processors, further cause the one or more processors to execute selecting and reading, from the drone definition table and the drone assignment table, and based on the delivery route data, a plurality of records associated with the particular drone.

In an embodiment, the one or more sequences of instructions which, when executed using one or more processors, further cause the one or more processors to execute determining a drone battery discharge amount associated with the distance, from a preceding node to a subsequent node, with respect to the particular node; based on the drone definition table and the drone assignment table, determining whether the drone battery discharge amount exceeds a maximum battery discharge amount of the particular drone; in response to determining that the battery discharge amount exceeds the maximum battery discharge amount, restoring the particular node in the delivery route data; and, otherwise, writing, to the one or more sortie tables in the database, the one or more sortie records corresponding to the sortie of the particular drone that can occur between the preceding node and the subsequent node.

In an embodiment, the one or more sequences of instructions which, when executed using one or more processors, further cause the one or more processors to execute operating the particular drone in a sortie between the preceding node and the subsequent node based on the one or more sortie tables in the database and the one or more sortie records corresponding to the sortie.

In an embodiment, the one or more sequences of instructions which, when executed using one or more processors, further cause the one or more processors to execute generating and transmitting, to a drone management system, a plurality of operating records that are configured for operating the particular drone in a sortie between the preceding node and the subsequent node based on the one or more sortie tables in the database and the one or more sortie records corresponding to the sortie.

2. Structural & Functional Overview 2.1 Distributed Computer System Example

FIG. 1 illustrates a distributed computer system showing the context of use and principal functional elements with which one embodiment could be implemented. In an embodiment, a computer system 101 comprises components implemented partially by hardware at one or more computing devices, such as one or more hardware processors executing stored program instructions stored in one or more memories for performing the functions described herein. In other words, all functions described herein are intended to indicate operations performed using programming in a special or general-purpose computer in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose, and claim a technical system and technical methods in which specially programmed computers, using a special-purpose distributed computer system design, execute functions that have not been available before to provide a practical application of computing technology to the problem of optimizing the routing algorithms that can leverage the benefits provided by a combined drone and truck delivery. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

A computer system 101 is programmed to receive input data, determine an optimized delivery route using the input data using various programmatic models, and then output data that corresponds to the determined delivery route. In particular embodiments, the input data and the output data for the computer system 101 may be provided in a table format, a table schema, or any other data format suitable for defining the parameters of the delivery routes. Examples of the input data include drone definition table 121, drone assignment table 123, and drone transit table 125. Examples of the output data include transportation summary table 132, sortie summary table 134, sortie details table 136, and sortie stops table 138. In one embodiment, the output data can be written to one or more sortie tables, as described in other sections. For each of these elements, the term "table" is used to refer to one possible means of data structure or organization, but other embodiments can use other means, such as JSON blobs, programmatic objects defined by classes, or flat files. The computer system 101 can be programmed to select, read, and/or access any of the tables as specified in other sections.

The computer system 101 may be implemented using a server-class computer or other computers having one or more processor cores, co-processors, or other computers. The computer system 101 may be a physical server computer and/or a virtual server instance stored in a data center, such as through cloud computing. The computer system 101 may be implemented with a database 151 to which data associated with the computer system is stored.

A computer system 101 may be communicatively coupled to a data communications network 160. The network 160 broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of computer system 101 may also have direct or indirect, wired or wireless communications links. The computer system 101, external customer system 172, and other elements of the system may each comprise an interface compatible with the network 160 and are programmed or configured to use standardized protocols for communication across the networks such as TCP/IP, Bluetooth, and higher-layer protocols such as HTTP, TLS, and the like.

A computer system 101 and a customer system 172 may be associated with entities having a customer-merchant relationship where the computer system 101 provides services to the customer system 172. For example, in the context of FIG. 1, the customer system 172 may be programmed to provide input data to the computer system 101. The computer system 101 may be programmed to process the input data, determine an optimized delivery route, and provide the output data corresponding to the delivery route back to the customer system 172. While a single customer system 172 is illustrated in FIG. 1 for purposes of illustrating a clear example, multiple customer systems may exist in embodiments disclosed herein. In an embodiment, the computer system 101 may be programmed to receive the input data from one particular customer system 172 and provide the output data to another customer system. The customer system 172 may include or can be communicatively coupled to, an asset system 182 and/or a drone system 184. An asset system 182 may be a computer system that stores data for, overlooks, maintains, or controls one or more assets. The asset system 182 may be programmed to configure one or more carrier trucks with the output data provided by the computer system 101 to execute deliveries using the optimized delivery route. A drone system 184 may be a system that overlooks, maintains, or controls one or more drones. A drone system 184 may be programmed to configure one or more drones with the output data provided by the computer system 101 to execute deliveries using the optimized delivery route. In an embodiment, the asset system 182 and the drone system 184 may be a combined system, for example, under the customer system 172. The customer system 172, asset system 182, and drone system 184 may each be a server-class computer or other computers having one or more processor cores, co-processors, or other computers. These systems may be communicatively coupled to a data communications network 160.

In particular embodiments, a customer system 172 may be referred to as a drone management system. In particular embodiments, a drone system 184 and/or asset system 182 may be controlled or operated by the computer system 101. For example, the computer system 101 may be configured to operate the drones and/or assets directly based on the output data.

2.2 Example Input Data

In an embodiment, a drone definition table 121 includes parameters that can be inputted into the system and relate to the characteristics or configurations of a drone that may be assigned a delivery task. Such characteristics or configurations may include the estimated cost of operating a drone, a drone's minimum and/or maximum capacity, a drone's battery capacity, and/or energy consumption, to name a few. In an embodiment, a drone may be assigned a type, or DroneType, that indicates a particular set of characteristics defined by the drone definition table. In particular embodiments, multiple drone types may be paired with a truck.

In particular embodiments, a drone may be configured with a fixed flight endurance model or a linear flight endurance model. If the values for both models are defined, the more restrictive model takes priority. In the fixed flight endurance model, the flight range is independent of the drone speed and payload. The drone's fixed flight range, measured in minutes, may be defined in the drone definition table. The linear flight endurance model assumes that the energy consumption is a linear function of shipment weight and requires defining three parameters: (1) the power consumption rate per unit weight, measured in watt/lb, (2) the power consumption rate to keep an empty drone moving or hovering, measured in watt, and (3) the energy of the battery loaded on the drone, measured in kJ. The linear energy consumption model assumes that the power consumption rates during different flight phases, takeoff, cruise, landing, and hovering, are the same.

A drone definition table 121 may comprise a plurality of rows or records having a plurality of columns that include the following example, non-exhaustive, and non-limiting entries:

| | | Drone Definition Table |
|---|---|---|
| ID | Field Name | Description |
| TypeName | DroneTypeId | Use this column to identify a specific type of drone. All drones of this type will have the same costs and constraints applied. |
| Max Flight Time | Range | For a fixed flight endurance model, enter the drone's maximum flight time as the length of time (in minutes) that the drone can operate on a single sortie. This value does not consider the battery capacity or consumption rates. |
| Battery Capacity | BatteryCapacity | For a linear flight endurance model, enter the drone's battery capacity in kJ (kilojoules). This value, in combination with the Consumption Rate and Empty Load Consumption Rate, determines the drone's flight endurance. |
| Consumption Rate | PerDistance-ConsumptionRate | For a linear flight endurance model, enter the rate at which battery power is consumed per unit weight. This is the rate when the drone is loaded, measured in watt/lb. This value, in combination with Battery Capacity and Empty Load Consumption Rate, determines the drone's flight endurance. In calculating the consumption of power, assume the following: watt/lb * lb = watt; watt * second = J; kJ = 1000 J; If the Consumption Rate for a drone is 100 watt/lb and the drone has a 10 lb shipment loaded, it consumes 1 kJ per second. If the Shipment does not have Weight populated, the weight is calculated as Unit Weight from Products * Quantity from Shipments. If Unit Weight is not defined, the solver will use the Max Flight Time as the endurance model. |
| Empty Load Consumption Rate | PerRepositionDistance-ConsumptionRate | For a linear flight endurance model, enter the rate at which battery power is consumed when the empty drone is moving or hovering. It is measured in watts. This value, in combination with Battery Capacity and Consumption Rate, determines the drone's flight endurance. |
| Speed | Speed | Enter the average speed at which the drone travels. |
| Capacity (Quantity) | MaxQty | Enter the maximum quantity capacity for the drone. Enter a value, then optionally select a quantity unit of measure. If you do not select a unit of measure, the default Quantity Unit Of Measure from Model Settings is used. The smallest of Capacity (Quantity), Capacity (Weight) and Capacity (Volume) is used as the constraint. |
| Capacity (Weight) | MaxWeight | Enter the maximum weight capacity for the drone. Enter a value, then optionally select a weight unit of measure. If you do not select a unit of measure, the default Weight Unit Of Measure from Model Settings is used. The smallest of Capacity (Quantity), Capacity (Weight) and Capacity (Volume) is used as the constraint. |

-continued

Drone Definition Table

| ID | Field Name | Description |
| --- | --- | --- |
| Capacity (Volume) | MaxCubic | Enter the maximum volume capacity for the drone. Enter a value, then optionally select a volume unit of measure. If you do not select a unit of measure, the default Volume Unit Of Measure from Model Settings is used. The smallest of Capacity (Quantity), Capacity (Weight) and Capacity (Volume) is used as the constraint. |
| Minimum Capacity (Quantity) | MinQty | Enter the minimum quantity capacity that must be carried by the drone. Enter a value, then optionally select a quantity unit of measure. If you do not select a unit of measure, the default Quantity Unit Of Measure from Model Settings is used. The largest of Minimum Capacity (Quantity), Minimum Capacity (Weight) and Minimum Capacity (Volume) is used as the constraint. |
| Minimum Capacity (Weight) | MinWeight | Enter the minimum weight capacity that must be carried by the drone. Enter a value, then optionally select a weight unit of measure. If you do not select a unit of measure, the default Weight Unit Of Measure from Model Settings is used. The largest of Minimum Capacity (Quantity), Minimum Capacity (Weight) and Minimum Capacity (Volume) is used as the constraint. |
| Minimum Capacity (Volume) | MinCubic | Enter the minimum volume capacity that must be carried by the drone. Enter a value, then optionally select a volume unit of measure. If you do not select a unit of measure, the default Volume Unit Of Measure from Model Settings is used. The largest of Minimum Capacity (Quantity), Minimum Capacity (Weight) and Minimum Capacity (Volume) is used as the constraint. |
| Fixed Launch Time | FixedLaunchTime | Enter the time incurred to launch the drone for a sortie. Allocate charging time to either the Fixed Launch Time or Fixed Retrieval Time. Enter a value, then optionally select a time unit of measure. If you do not select a unit of measure, the default Time Unit Of Measure from Model Settings is used. |
| Fixed Service Time | FixedServiceTime | Enter the time incurred at the customer location to perform a delivery. Enter a value, then optionally select a time unit of measure. If you do not select a unit of measure, the default Time Unit Of Measure from Model Settings is used. |
| Fixed Retrieval Time | FixedRetrievalTime | Enter the time incurred to retrieve the drone for a sortie. Allocate charging time to either the Fixed Launch Time or Fixed Retrieval Time. Enter a value, then optionally select a time unit of measure. If you do not select a unit of measure, the default Time Unit Of Measure from Model Settings is used. |
| Fixed Drone Cost | FixedCost | Enter the fixed cost incurred to use the drone on the route. When there are multiple sorties associated with the route, the Fixed Drone Cost is applied only once. Enter a value, then optionally select a currency. If you do not select a currency, the default Currency from Model Settings is used. |
| Status | Status | One of Include, Exclude. Choose the drone status: Include—This drone is included when the model is run. Exclude—This drone is excluded when the model is run. Default: Include |

In an embodiment, a drone assignment table 123 includes parameters that can be inputted into the system and relate to the association between the drones and transportation assets (e.g., trucks, carriers). The drone assignment table 123 can be used to associate certain types of drones to a particular asset. A drone assignment table 123 may comprise a plurality of rows or records having a plurality of columns that include the following example, non-exhaustive, and non-limiting entries:

| | Drone Assignment Table | |
|---|---|---|
| ID | Field Name | Description |
| Carrier | DroneCarrierId | Select the transportation asset to which the drone is paired. |
| Drone Type | DroneTypeId | Select the drone type that is assigned to the asset. |
| Available Units | AvailableQty | Enter the number of drones of the specific drone type that are available for the select carrier asset. For example, assume a carrier asset has 20 Available Units and the asset itself is assigned to 30 routes. In this case, no more than 20 of the 30 routes can have sorties. |
| Status | Status | One of Include, Exclude.<br>Choose the drone assignment status:<br>Include—This drone assignment is included when the model is run.<br>Exclude—This drone assignment is excluded when the model is run.<br>Default: Include |

In an embodiment, a drone transit table 125 includes parameters that can be inputted into the system and relate to the transit route that a drone takes from one location to another. In an embodiment, a location from which a drone travels (e.g., origin location) or a location to which a drone is to travel (e.g., destination location) may be specified by an address, coordinate points, name of point-of-interest, area of location, and/or by user-selection on a digital map. In an embodiment, a drone may be configured on default to travel in a straight line from the origin location to the destination location. Data for a drone in drone transit table 125 may be used to customize the route that the drone takes, for example, by configuring the drone to avoid certain areas, to travel at certain altitudes, and/or to avoid certain obstacles such as structures or bodies of water. A drone transit table 125 may comprise a plurality of rows or records having a plurality of columns that include the following example, non-exhaustive, and non-limiting entries:

| | Drone Transit Table | |
|---|---|---|
| ID | Field Name | Description |
| Origin | OriginId | Select the origin location. This can be an individual site or customer, or a site or customer filter or group. |
| Destination | DestinationId | Select the destination location. This can be an individual site or customer, or a site or customer filter or group. |
| Travel Time | TravelTime | The time required to travel from the origin to the destination location. This value overrides the calculated travel time. Enter a value, then optionally select a time unit of measure. If you do not select a unit of measure, the default Time Unit |
| Travel Distance | Distance | The distance from the origin to the destination location. This value overrides the calculated travel distance. Enter a value, then optionally select a distance unit of measure. If you do not select a unit of measure, the Distance Unit Of Measure from Model Settings is used. |
| Drone Type | EquipmentTypeId | Select the drone type to which this table applies. This can be an individual drone type, or a drone filter or group. |
| Is Symmetric | IsSymmetric | One of Yes, No. (Actual database values are 1, 0.)<br>Set this to Yes if the Travel Time and Travel Distance from the Origin to Destination are the same as from the Destination to Origin. |
| Status | Status | One of Include, Exclude.<br>Choose the table status:<br>Include—This table is included when the model is run.<br>Exclude—This table is excluded when the model is run.<br>Default: Include |

2.3 Example Programming Models

In particular embodiments, the computer system 101 may be programmed to process the input data (e.g., drone definition table 121, drone assignment table 123, and/or drone transit table 125) using programmatical models and algorithms to determine a delivery route.

Over the course of a delivery cycle, a drone may make multiple sorties along the carrier route. A sortie is a delivery carried out by a drone. A carrier route, or a truck route, is a transportation route carried out by a truck that has the capability to launch, retrieve, and service a drone.

Figure 2:
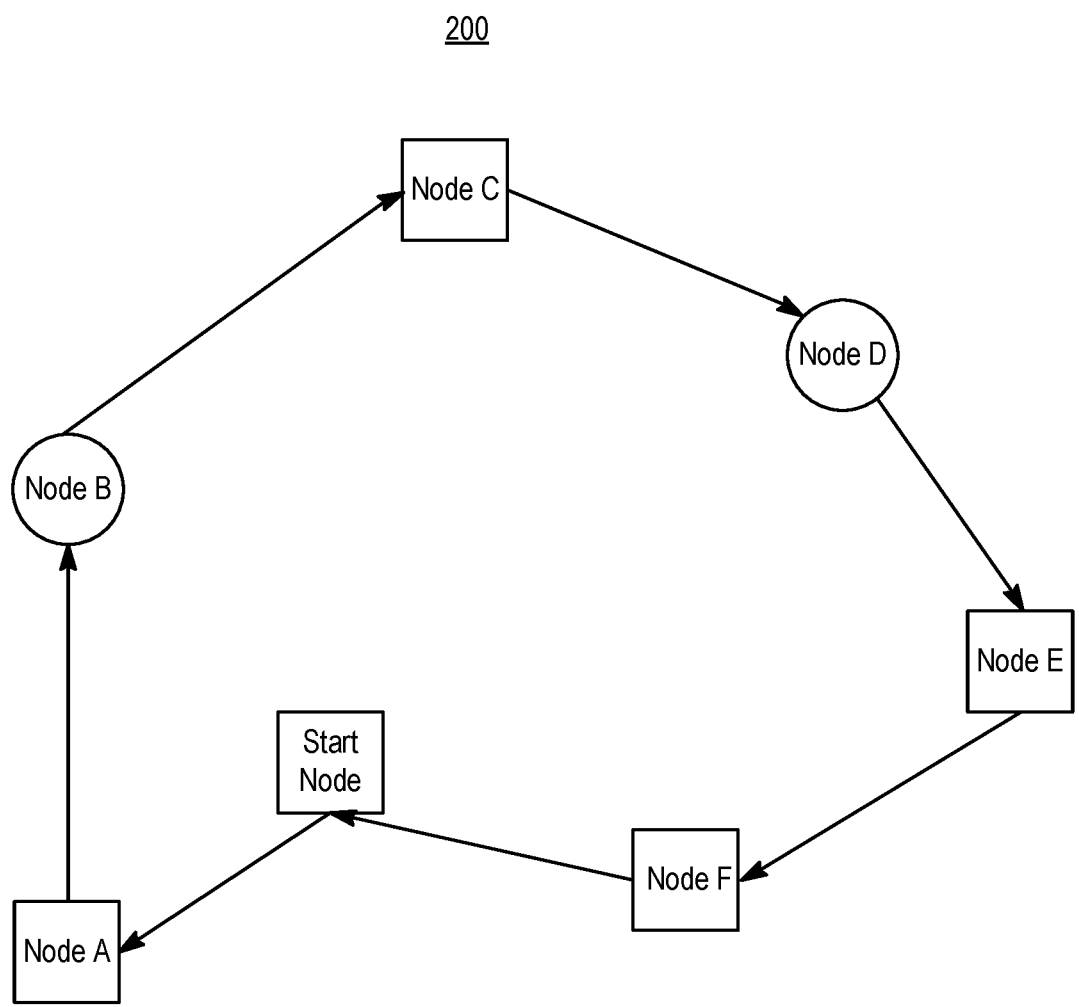
FIG. 2 illustrates an example delivery route.

A carrier route may include the following sequence of stops: a pickup stop at the vehicle domicile (starting location), a number of delivery stops at customer locations, and a stop back at the vehicle domicile. FIG. 2 illustrates an example carrier route 200 with six (6) delivery stops. The "Start Node" represents the starting location (e.g., vehicle domicile), and Nodes A, B, C, D, E, and F represent the six (6) delivery stops.

Figure 3:
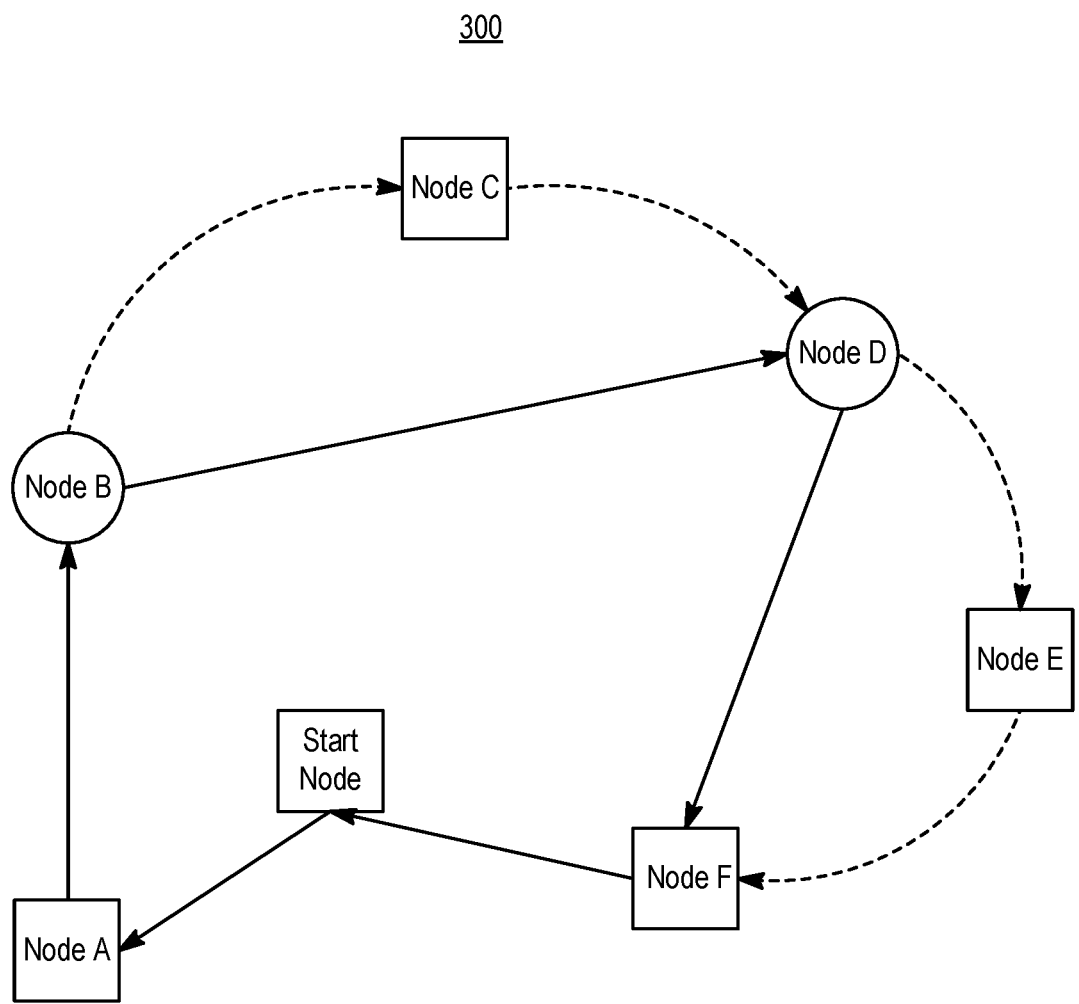
FIG. 3 illustrates another example delivery route.

FIG. 3 illustrates another example carrier route 300 with some of the nodes being assigned to a sortie (delivery by a drone) rather than having a carrier travel to those nodes. The square-shaped nodes represent locations or customers that can be served by either a drone or a carrier. The circle-shaped nodes represent locations or customers that can only be served by a carrier. The dotted lines represent the travel route of a drone or a sortie. The solid lines represent the travel route of a carrier.

In particular embodiments, the computer system 101 may be programmed to determine a travel route by using a heuristic or an optimization algorithm to construct sorties, in conjunction with a linear programming (LP) model to schedule each sortie. In an embodiment, the computer system 101 considers multiple drone-pairing options and selects one that results in the lowest total transportation cost as the solution for the delivery cycle. In this context, "cost" can refer not just to monetary or financial costs associated with operation but time, distance, battery charge, or other factors that constitute costs in a technical, structural, or engineering sense. The term "drone-pairing option" is used herein to represent a candidate pair between a particular drone type/model and an asset. A delivery cycle includes the completion of all of the deliveries in a given area, such as those illustrated in FIG. 2 or FIG. 3.

In particular embodiments, the programming model disclosed herein may be programmed to determine the effective flight range of a drone. In particular embodiments, a carrier truck may be programmed to serve other customers in between drone launch and retrieval locations while the drone is serving a customer. In particular embodiments, drones are launched with a full battery from the trucks. In particular embodiments, the programming model may be configured to assume that the launches and the retrievals of drones only take place when the truck is at a stop. In particular embodiments, the programming model may be configured to assume that, for a given route, only one sortie is performed at a time. In particular embodiments, the programming model may be configured to assume that a drone must remain airborne while waiting to rendezvous with the truck if the range or battery allows. If the battery life or range isn't long enough for a rendezvous, the sortie may not be scheduled, even if the drone has enough power for the delivery stop.

Each of the drone-pairing options can be defined by various attributes that characterizes the drone-pairing option, for example, the drone's maximum flight time, battery capacity, energy consumption per time unit, payload capacity, service time requirements, and travel time between stops, and etc. The computer system 101 is programmed with the objective of replacing as many truck delivery stops with sortie delivery stops as possible using the cheapest drone-pairing options (e.g., the shortest delivery time and the most cost savings). The computer system 101 is configured to accomplish this objective by progressively introducing more and more sorties to replace the truck deliveries in a greedy fashion for each drone-pairing option then identifying the option with the lowest cost. Section 2.3.1 describes an example programming model for scheduling a sortie and Section 2.3.2 describes an example optimization algorithm that constructs sorties and selects the cheapest pairing option.

2.3.1 Sortie Scheduling Model

This section describes a sortie scheduling model 156 that provides a solution to a Sortie-Scheduling Problem (SSP). The sortie scheduling model 156 is programmed to use the input data described in Section 2.2 to determine whether a feasible schedule exists for a particular sortie amongst a set of stops I to be visited by a particular drone-pairing option d.

A sortie has three stops: a launch stop, a delivery stop, and a rendezvous stop. The schedule of the sortie is defined by its pairing option's start of service times at each of its stops. In an embodiment, each of the drone's stops may be associated with a service time for the various activities that are to be performed. At the launch stop (e.g., Node B in FIG. 3), the service time may be the time required to swap or charge the battery and/or to load a shipment. The launch service time may be referred to as fixed launch time. At the delivery stop (e.g., Node C in FIG. 3), the service time may be the time to perform delivery at the customer locations. The delivery service time may be referred to as fixed service time. At the rendezvous stop (e.g., Node D in FIG. 3), the service time may be the time to retrieve the drone and/or to dock the drone to the carrier. The rendezvous service time may be referred to as fixed retrieval time.

The programming model for the SSP may be configured with the following bulleted assumptions. The programming model may also be formalized by Constraints (1)-(8) shown further below and the notation used in the formulation is defined in Tables 1, 2, and 3 shown further below.
- There is a positive service duration at each stop. Service occurs at each stop but the drone is in flight during service only at stop 2 (the delivery stop); the drone remains on the ground during service at stops 1 (the launch stop) and 3 (the rendezvous stop).
- Service at any stop i must occur between $c_i$ and $b_i$, but the drone can arrive earlier than $c_i$ but no earlier than $a_i$.
- Waiting occurs at stop i if the drone arrives before $\mathcal{T}_i$; it also only occurs at stops 2 and 3. The power consumption values $\rho$ and $\rho_{empty}$ are pre-calculated based on the load on the drone.
- The calculation of the power consumption with load, $\rho$, assuming that the energy consumption is a linear function of load weight (but not velocity).
- The drone flies with the load beginning from the end of service at stop 1 until the end of service at stop 2, and it flies empty from the end of service at stop 2 until the start of service at stop 3.

TABLE 1

Set notation for the SSP

| Set | Definition |
|---|---|
| I = {1, 2, 3} | Set of the three sortie stops. 1 represents the launch stop, 2 represents the delivery stop, and 3 represents the rendezvous stop |

TABLE 2

Data notation for the SSP

| Data | Definition |
|---|---|
| $a_i$ | The earliest time the drone can arrive at the stop i |
| $b_i$ | Latest time a drone must leave stop i |
| $c_i$ | The earliest time service can start at stop i |
| $s_i$ | Service duration at stop i |
| $\tau_{i,j}$ | Travel time from stop i to stop j for drone-pairing option d |
| $\omega$ | Maximum wait time at stops 2 and 3 |
| f | Maximum flight duration for drone-pairing option d |
| e | Battery capacity for drone-pairing option d |
| $\rho_{empty}$ | Power consumption at empty load for drone-pairing option d |
| $\rho$ | Power consumption with load for drone-pairing option d |

TABLE 3

Variable notation for the SSP

| Variable | Definition |
|---|---|
| $\mathcal{T}_i$ | Service start time at stop i |
| $\mathcal{W}_i$ | Wait time at stop i |

Constraints $$\min \mathcal{W}_2 + \mathcal{W}_3 \quad (1)$$

s.t.

$$\forall i \in I \; c_i \leq \mathcal{T}_i \quad (2)$$

$$\forall i \in I \; \mathcal{T}_i + s_i \leq b_i \quad (3)$$

$$\forall i \in I \setminus \{1\} \; a_i \leq \mathcal{T}_{i-1} + s_{i-1} + \tau_{i-1,i} \quad (4)$$

$$\forall i \in I \setminus \{1\} \; \mathcal{W}_i = \mathcal{T}_i - (\mathcal{T}_{i-1} + s_{i-1} + \tau_{i-1,i}) \quad (5)$$

$$\forall i \in I \setminus \{1\} \; \mathcal{W}_i \leq \omega \quad (6)$$

$$\tau_{1,2} + \mathcal{W}_2 + s_2 + \tau_{2,3} + \mathcal{W}_3 \leq f \quad (7)$$

$$\rho \cdot (\tau_{1,2} + \mathcal{W}_2 + s_2) + \rho_{empty} \cdot (\tau_{2,3} + \mathcal{W}_3) \leq e \quad (8)$$

The model uses two sets of continuous variables: variable $\mathcal{T}_i$ represents the start of service time at stop i and variable $\mathcal{W}_i$ represents the wait time at stop i. The model's objective function minimizes the total wait time at the delivery and rendezvous stops. Constraints (2), (3), and (4) are time-window constraints for the stops. Constraint (5) defines the wait-time variables and Constraint (6) enforces upper limits on the wait times. Constraint (7) describes the flight-duration limit of the sortie, while Constraint (8) ensures that the drone's energy consumption does not exceed its battery limit. In the sequel, let SSP(I, d) denote a Boolean function that solves the SSP with data from sortie stops I and drone-pairing option d. The function returns true if a feasible schedule exists for the problem and false otherwise.

2.3.2 Truck-Drone Scheduling Algorithm

This section describes an example truck-drone scheduling algorithm 157. The algorithm uses the input data described in Section 2.2 to construct sorties and select the cheapest pairing option. The algorithm takes a list of drones that can be paired with a carrier route. The initial state of the carrier route is a sequence of stops that begins with a pickup stop followed by a series of delivery stops, all of which are served by the carrier and thus there are no sorties (an example of such a route is shown in FIG. 2). The algorithm progressively introduces more and more sorties that replace these carrier delivery stops with sortie stops in a greedy fashion with the goal of reducing the total cost.

In an embodiment, starting from the first drone-eligible customer in a given route, the algorithm traverses through all the drone-eligible customers in the route, following the original order of route stops, and attempts to generate a sortie for each. As long as the travel time and maximum flight time or battery allow, the first drone-eligible customer may actually be served by the drone straight from the depot.

One example of the truck-drone scheduling algorithm 157 can be programmed using Algorithm 1 and Algorithm 2 as shown below. Algorithm 1 creates a single sortie given a list of candidate sortie stops, and Algorithm 2 uses that result to create (and schedule) multiple sorties for a carrier route. Each of the algorithms can be programmed, based on the pseudocode shown for the algorithms, using any programming language that computer system 101 can execute, such as machine language, assembler, C, Objective-C, C++, Java, Pascal, and others.

Algorithm 1 Sortie-Construction Algorithm (SCA)

Require: Sequence of candidate sortie stops C = 1, 2, ... , N, drone-pairing option d
1: for i = 1 to N − 2 do
2:    Select candidate launch stop $s_{launch}$ = i
3:    Select candidate delivery stop $s_{delivery}$ = i + 1
4:    for j = i + 2 to N do
5:       Select candidate rendezvous stop $s_{rendezvous}$ = J
6:       if SSP(I = { $s_{launch}$, $s_{delivery}$, $s_{rendezvous}$}, d) then
7:          return (I, d)
8:       end if
9:    end for
10: end for
11: return ⊥

Algorithm 1 is a procedure that creates a single sortie from a sequence of N candidate sortie stops, C=1, 2, . . . , N, and a drone-pairing option d. Algorithm 1 begins by first selecting a pair of candidate launch and delivery stops, denoted by $s_{launch}$ and $s_{delivery}$ respectively, by considering a stop i from the sequence of 1 to N−2 for $s_{launch}$ and a stop i+1 that immediately succeeds stop i for $s_{delivery}$ (lines 1-3). Algorithm 1 then selects a rendezvous stop, $s_{rendezvous}$, by considering all stops succeeding stop i+1 as candidates (lines 4-5). The three candidate sortie stops, I={$s_{launch}$, $s_{delivery}$, $s_{rendezvous}$}, and the drone-pairing option d, are then passed into function SSP to determine whether a feasible schedule exists for the sortie. If it does, Algorithm 1 will return the sortie (I, d) as its result (lines 6-8). Otherwise, Algorithm 1 considers other three-stop combinations and continues to search for one that would admit a feasible schedule. Finally, Algorithm 1 returns null if it cannot discover a sortie with a feasible schedule (line 11). Thereafter, let SCA(C, d) denote a function that takes in a sequence of candidate sortie stops C and a drone-pairing option d. The function returns a sortie represented by its three stops I and its drone-pairing option d if it admits a feasible schedule.

---

Algorithm 2 Constructing Sorties for a Carrier Route r

Require: Sequence of stops for carrier route r, $R_r = 1, 2, ..., N$, Set of drone-pairing options for route r, $D_r$.
1: $U_r = \emptyset$
2: for each $d \in D_r$ do
3:     $L_r^d = \emptyset$
4:     $r' = r, R_{r'} = R_r$
5:     Initialize candidate sortie stops C = 1, 2, ..., N
6:     S = SCA(C, d)
7:     while $S \neq \perp$ do
8:         Update r' by removing $s_{delivery}(S)$ from $R_{r'}$
9:         $L_r^d = L_r^d \cup \{S\}$
10:        C = $s_{rendezvous}(S), s_{rendezvous}(S) + 1, ... , N$
11:        S = SCA(C, d)
12:     end while
13:     $U_r = U_r \cup \{(r', L_r^d)\}$
14: end for
15: return arg $\min_{u \in U_r}$ Cost(u)

---

Algorithm 2 is a procedure for scheduling sorties for a carrier route and its available drone-pairing options. For each drone-pairing option, Algorithm 2 progressively introduces more and more sorties to replace the delivery stops on the carrier route. Algorithm 2 first creates a solution that consists of an updated carrier route with a list of scheduled sorties for each pairing option then returns the solution with the lowest cost.

Algorithm 2 requires a carrier route, r, the sequence of N stops on r, $R_r = 1, 2, ..., N$, and the drone-pairing options for r, $D_r$. Algorithm 2 begins with an empty list $U_r$ that will be used to store the solutions obtained by evaluating each drone-pairing option $d \in D_r$ (line 1). Each drone-pairing option is evaluated in lines 2-14. For each $d \in D_r$, Algorithm 2 first creates an empty list $L_r^d$ to store the sorties to be created by d on r, a copy of r as denoted by r', and a copy of $R_r$ as denoted by $R_{r'}$ (lines 2-4). Lines 5-6 represent the initialization of candidate sortie stops C and the passing of C and d into function SCA, whose return value is stored in S. Lines 7-12 progressively introduce sorties to replace the delivery stops of r': If S is not a null value, r' is updated; the delivery stop of the sortie S, denoted by $s_{delivery}(S)$, is removed from $R_{r'}$. Sortie S is then added to $L_r^d$ and C is updated to start from the rendezvous stop of S, as denoted by $s_{rendezvous}(S)$. The updated C is then passed into SCA with d and this process is repeated until SCA is unable to discover a sortie with a feasible schedule. Line 13 stores the final solution for option d, the resulting r' and at its list of sorties $L_r^d$, into $U_r$. Finally, line 15 returns the lowest cost solution among $U_r$.

The computer system 101 processes the input data using the programming model and algorithms described herein and outputs data that represents an optimized delivery route. In an embodiment, the output data includes transportation summary table 132, sortie summary table 134, sortie details table 136, and/or sortie stops table 138, all of which may be formatted in a table format, or any other data format suitable for representing the details, parameters, and/or characteristics of a delivery route for drones and carriers.

2.4 Example Output Data

In an embodiment, a transportation summary table 132 includes details that can be outputted by the system and relate to high-level metrics for the drones assigned to carrier assets, including the number of drones available and the number used in the solution. A transportation summary table 132 may include the following example, non-exhaustive, and non-limiting entries:

| | Transportation Summary Table | |
|---|---|---|
| ID | Field Name | Description |
| Scenario | Scenario | The scenario for which the output data was generated. |
| Carrier | DroneCarrierName | The identifier of the carrier asset to which the drone is assigned. |
| Drone | DroneTypeName | The drone type that is assigned to the carrier asset. |
| Drones Available | NumOfDronesAvailable | The total number of drones available for this carrier asset. |
| Drones Used | NumOfDronesUsed | The number of drones assigned to this carrier asset that are used in the solution. |
| Scenario ID | ScenarioId | The identifier of the scenario for which the output data was generated. |
| Sub-Scenario ID | StepNumber | The identifier of the sub-scenario, if applicable, for which the output data was generated. |

In an embodiment, a sortie summary table 134 includes details that can be outputted by the system and relate to information about the sorties that are carried out by drones. This information includes the distance, weight, volume, and quantity incurred by the drone, the start and end times for the sortie, and the time incurred for travel, wait, and service. A sortie summary table 134 may include the following example, non-exhaustive, and non-limiting entries:

Sortie Summary Table

| ID | Field Name | Description |
| --- | --- | --- |
| Scenario | Scenario | The scenario for which the output data was generated. |
| Drone | DroneTypeName | The drone type that is used for the sortie. |
| Route ID | RouteId | The identifier of the route that is used for the sortie. |
| Total Distance | TotalDistance | The total distance incurred for the sortie. |
| Total Weight | TotalWeight | The total weight carried on the sortie. |
| Total Volume | TotalCubic | The total volume carried on the sortie. |
| Total Quantity | TotalQty | The total quantity carried on the sortie. |
| Start Date Time | Start DateTime | The start time of the sortie. |
| End Date Time | EndDateTime | The end time of the sortie. |
| Total Time | TotalTime | The total time incurred on the sortie. |
| Travel Time | TravelTime | The time incurred for travel on the sortie. |
| Wait Time | WaitTime | The wait time incurred on the sortie. |
| Service Time | ServiceTime | The service time incurred on the sortie. |
| Start Date Time Local | Start DateTimeLocal | The start time of the sortie in the local time zone. |
| End Date Time Local | EndDateTimeLocal | The end time of the sortie in the local time zone. |
| Max Weight | MaxWeight | The maximum weight allowed on the sortie. |
| Max Volume | MaxCubic | The maximum volume allowed on the sortie. |
| Max Quantity | MaxQty | The maximum quantity allowed on the sortie. |
| Drone ID | DroneId | The identifier of the drone assigned to the sortie. |
| Sortie Sequence ID | SortieSequenceId | The sequence number of the sortie on the route. |
| Sortie Utilization | SortieUtilization | The utilization of the sortie based on the loaded quantity, weight or volume compared to the maximum capacities. |
| Scenario ID | ScenarioId | The identifier of the scenario for which the output data was generated. |
| Sub-Scenario ID | StepNumber | The identifier of the sub-scenario, if applicable, for which the output data was generated. |

In an embodiment, a sortie details table 136 includes details that can be outputted by the system and relate to the sorties that are carried out by drones. For example, such details may include the start and end locations, load or unload quantity, weight and volume, and shipment counts. A sortie details table 136 may include the following example, non-exhaustive, and non-limiting entries:

Sortie Details Table

| ID | Field Name | Description |
| --- | --- | --- |
| Scenario | Scenario | The scenario for which the output data was generated. |
| Drone | DroneTypeName | The drone type used on the sortie. |
| Drone ID | DroneId | The identifier of the drone used on the sortie. |
| Sortie ID | SortieId | The identifier of the sortie. |
| Gantt ID | GanttID | The identifier used to represent the sortie on a gantt chart. |
| Start Location | StartLocation Name | The start location of the sortie. |
| End Location | EndLocationName | The end location of the sortie. |
| Activity Type | ActivityType | The type of activity carried out on the sortie. Activities include: Equipment Start, Wait, Load, Travel, Unload, Retrieve and Equipment End. |
| Activity Start Time | ActivityStartDateTime | The start time for the sortie activity. |
| Activity End Time | ActivityEndDateTime | The end time for the sortie activity. |

Sortie Details Table

| ID | Field Name | Description |
|---|---|---|
| Distance | Distance | If the Activity Type is "Travel", this is the distance incurred for that activity. For other activities, the Distance is 0. |
| Cumulative Distance | CumulativeDistance | The total distance traveled on the sortie at the point of the specific activity. Distance is only incurred for Travel, so you will see any travel distance reported prior to the current activity. |
| Activity Time | ActivityTime | The time incurred for the activity on the sortie. |
| Cumulative Time | CumulativeTime | The total time incurred on the sortie at the point of the specific activity. |
| Load Unload Quantity | LoadUnloadQty | The quantity that is loaded/unloaded on the sortie. |
| Load Unload Weight | LoadUnloadWeight | The weight that is loaded or unloaded on the sortie. |
| Load Unload Volume | LoadUnloadCubic | The volume that is loaded or unloaded on the sortie. |
| Load Unload Shipment Count | LoadUnloadShipmentCount | The number of shipments that are loaded or unloaded on the sortie. |
| Total Quantity | TotalQty | The total quantity on the sortie. |
| Total Weight | TotalWeight | The total weight on the sortie. |
| Total Volume | TotalCubic | The total volume on the sortie. |
| Total Shipment Count | TotalShipmentCount | The total number of shipments on the sortie. |
| Remaining Quantity Capacity | RemainingQtyCapacity | The quantity capacity remaining for the drone assigned to the sortie. |
| Remaining Weight Capacity | RemainingWeightCapacity | The weight capacity remaining for the drone assigned to the sortie. |
| Remaining Volume Capacity | RemainingCubicCapacity | The volume capacity remaining for the drone assigned to the sortie. |
| Start Location Latitude | StartLocationLatitude | The latitude of the start location for the sortie. |
| Start Location Longitude | StartLocationLongitude | The longitude of the start location for the sortie. |
| End Location Latitude | EndLocationLatitude | The latitude of the end location for the sortie. |
| End Location Longitude | EndLocationLongitude | The longitude of the start location for the sortie. |
| Activity Start Time Local | ActivityStartTimeLocal | The number of drones assigned to this carrier asset that are used in the solution. |
| Activity End Time Local | ActivityEndTimeLocal | The start time for the sortie activity in the local time zone. |
| Scenario ID | ScenarioId | The end time for the sortie activity in the local time zone. |
| Sub-Scenario ID | StepNumber | The identifier of the sub-scenario, if applicable, for which the output data was generated. |

In an embodiment, a sortie segments table includes details that can be outputted by the system and relate to information about the segments that make up the sortie. For example, such information may include the start and end times for the segment, and the time and distance incurred. A sortie segments table may include the following example, non-exhaustive, and non-limiting entries:

Sortie Segments Table

| ID | Field Name | Description |
|---|---|---|
| Scenario | Scenario | The scenario for which the output data was generated. |
| Start Date Time | Start Date Time | The start time of the sortie segment. |
| End Date Time | EndDateTime | The end time of the sortie segment. |

-continued

| | Sortie Segments Table | |
|---|---|---|
| ID | Field Name | Description |
| Distance | Distance | The total distance incurred for the sortie segment. |
| Flight Time | FlightTime | The time in flight during this segment. |
| Start Date Time Local | StartDateTimeLocal | The start time of the sortie segment in the local time zone. |
| End Date Time Local | EndDateTimeLocal | The end time of the sortie segment in the local time zone. |
| Sortie ID | SortieId | The identifier of the sortie that the segment is part of. |
| Sequence ID | SequenceId | The sequence number of this segment on the sortie. |
| Start Stop ID | StartStopId | The identifier of the start stop on the segment. |
| End Stop ID | EndStopId | The identifier of the end stop on the segment. |
| Scenario ID | ScenarioId | The identifier of the scenario for which the output data was generated. |
| Sub-Scenario ID | StepNumber | The identifier of the sub-scenario, if applicable, for which the output data was generated. |

In an embodiment, a sortie stops table 138 includes details that can be outputted by the system and relates to information about the stops on the sortie. For example, such information may include the arrival, delivery and leave times at the stop, pickup and delivery amounts at the stop, and the latitude and longitude of the stop location. A sortie stops table 138 may include the following example, non-exhaustive, and non-limiting entries:

| | Sortie Stops Table | |
|---|---|---|
| ID | Field Name | Description |
| Scenario | Scenario | The scenario for which the output data was generated. |
| Stop ID | StopId | The identifier of the stop on the sortie. |
| Sequence ID | SequenceId | The sequence number of the stop on the sortie. |
| Site Name | LocationName | The name of the site location for the stop. |
| Arrival Date Time | ArriveDateTime | The time when the drone arrives at the stop. |
| Delivery Date Time | DeliveryDateTime | The time when the drone starts delivery at the stop. |
| Leave Date Time | LeaveDateTime | The time when the drone leaves the stop. |
| Latitude | Latitude | The latitude of the stop site. |
| Longitude | Longitude | The longitude of the stop site. |
| Stop Type | StopType | The type of activity at the stop. The Stop Type is one of Launch, Delivery, or Rendezvous. |
| Pickup Quantity | PickupQty | The quantity picked up at the stop. |
| Pickup Weight | PickupWeight | The weight picked up at the stop. |
| Pickup Volume | PickupCubic | The volume picked up at the stop. |
| Delivered Quantity | DeliveredQty | The quantity delivered at the stop. |
| Delivered Weight | DeliveredWeight | The weight delivered at the stop. |
| Delivered Volume | DeliveredCubic | The volume delivered at the stop. |
| Remaining Quantity | RemainingQty | The quantity remaining on the sortie. |
| Remaining Weight | RemainingWeight | The weight remaining on the sortie. |
| Remaining Volume | RemainingCubic | The volume remaining on the sortie. |
| Arrival Date Time Local | ArriveDateTimeLocal | The time when the drone arrives at the stop in the local time zone. |
| Delivery Date Time Local | DeliveryDateTimeLocal | The time when the drone starts delivery at the stop in the local time zone. |
| Leave Date Time Local | Leave DateTimeLocal | The time when the drone leaves the stop in the local time zone. |
| Range At Arrival | RangeAtArrival | The drone's remaining range when arriving at the stop. |

-continued

Sortie Stops Table

| ID | Field Name | Description |
|---|---|---|
| Range When Leaving | RangeWhenLeaving | The drone's remaining range when leaving the stop. |
| Scenario ID | ScenarioId | The identifier of the scenario for which the output data was generated. |
| Sub-Scenario ID | StepNumber | The identifier of the sub-scenario, if applicable, for which the output data was generated. |

2.2 Example Data Processing Flows

Figure 4:
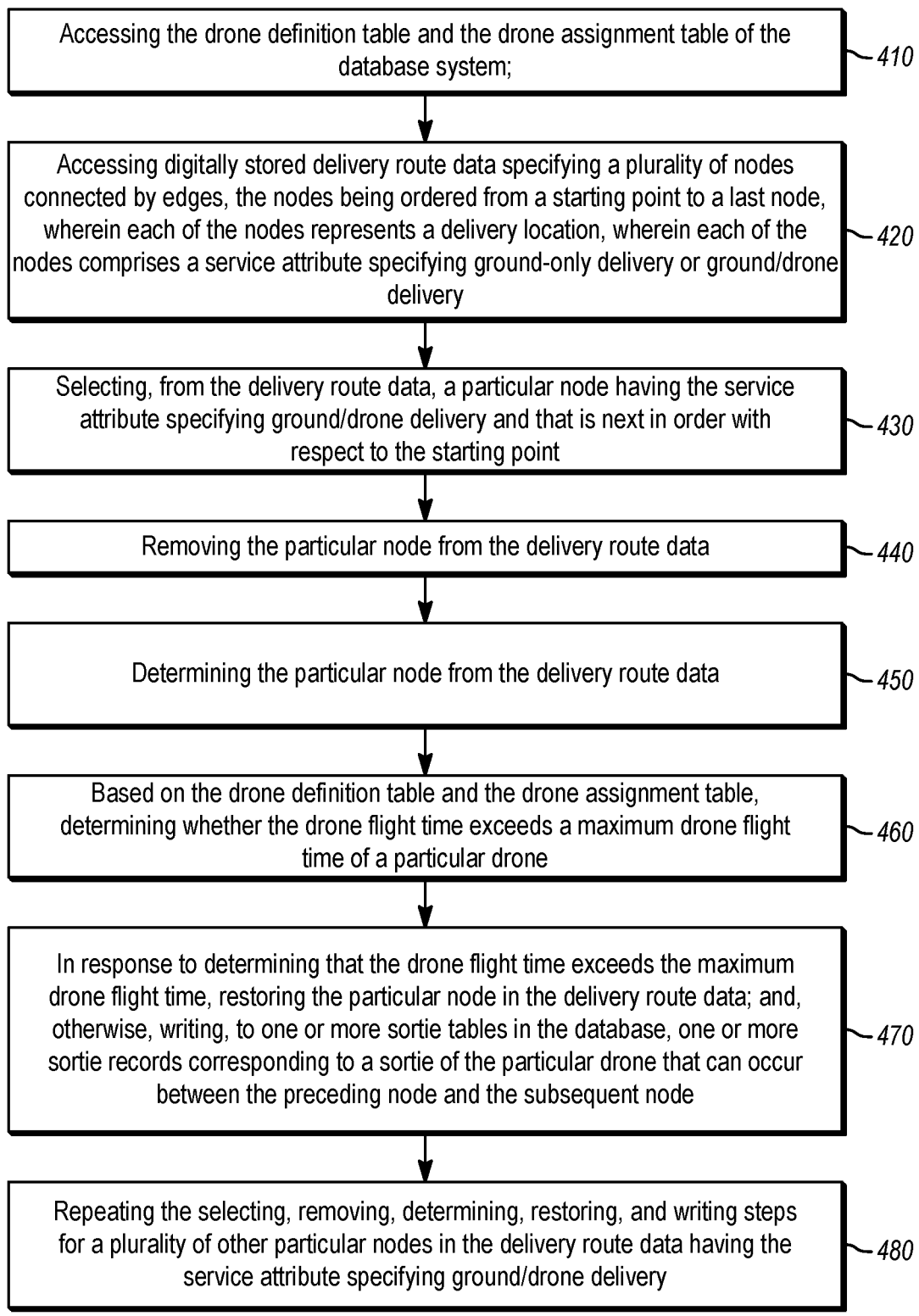
FIG. 4 illustrates an example computer-implemented method for determining a delivery route.

FIG. 4 illustrates an example process for determining a delivery route for a delivery cycle. FIG. 4 and each other flow diagram herein are intended as an illustration of the functional level at which skilled persons, in the art to which this disclosure pertains, communicate with one another to describe and implement a computer-implemented method, as described further herein and/or algorithms using programming. The flow diagrams are not intended to illustrate every instruction, method object, or sub-step that would be needed to program every aspect of a working program but are provided at the same functional level of illustration that is normally used at the high level of skill in this art to communicate the basis of developing working programs.

At the beginning of the example process of FIG. 4, in an embodiment, all deliveries are assigned to a ground vehicle and none to the drone or sortie. The steps described below describe the process of evaluating each of the nodes that can be served by a drone, and if the cost-benefit analysis favors being served by a drone, replacing or updating the nodes so that they are served by a drone rather than a carrier.

At step 410, a computer system is programmed to access or read the drone definition table and the drone assignment table of the database system. In particular embodiments, the drone definition table and the drone assignment table may be provided to the computer system 101 by a customer system.

At step 420, a computer system is programmed to access digitally stored delivery route data specifying a plurality of nodes connected by edges, the nodes being ordered from a starting point to a last node, wherein each of the nodes represents a delivery location, wherein each of the nodes comprises a service attribute specifying ground-only delivery or ground and drone delivery. Examples of nodes and edges are shown in FIG. 2 and FIG. 3. In FIG. 3, the square-shaped nodes represent locations or customers that can be served by either a drone or a carrier. The circle-shaped nodes represent locations or customers that can only be served by a carrier. The dotted lines represent the travel route of a drone, or a sortie. The solid lines represent the travel route of a carrier. In particular embodiments, the delivery route data may be stored in database 151.

At step 430, a computer system is programmed to select, from the delivery route data, a particular node having the service attribute specifying ground and drone delivery and that is next in order with respect to the starting point. In particular embodiments, the service attribute specifying ground and drone delivery indicates that the node can be served by either a drone or a carrier. In particular embodiments, the system may be configured to use the programming model or algorithms described herein to determine whether a particular node should be served by a drone or an asset.

In particular embodiments, the computer system may be programmed to determine, using the programming model and/or algorithms disclosed herein, whether the particular node can be served using a drone rather than a carrier. This determination may involve the following steps. At step 440, a computer system is programmed to remove the particular node from the delivery route data. At step 450, a computer system is programmed to determine a drone flight time associated with a distance, from a preceding node to a subsequent node, with respect to the particular node. At step 460, a computer system is programmed to, based on the drone definition table and the drone assignment table, determine whether the drone flight time exceeds the maximum drone flight time of a particular drone. At step 470, a computer system is programmed to, in response to determining that the drone flight time exceeds the maximum drone flight time, restore the particular node in the delivery route data; and, otherwise, write, to one or more sortie tables in the database, one or more sortie records corresponding to a sortie of the particular drone that can occur between the preceding node and the subsequent node.

Based at least on steps 440, 450, 460, and 470, the computer system is programmed to determine whether the particular node can be served by a sortie, or by a drone based on the estimated drone flight time and the maximum drone flight time. For example, the estimated drone flight time may be determined based on launch service time, delivery service time, and rendezvous service time. The maximum drone flight time may be determined based in part on the drone's battery capacity, as well as the shipment or load weight. In particular embodiments, the computer system may be programmed to evaluate more than just the flight times, including any of the entries shown in the drone definition table 121, drone assignment table 123, and/or drone transit table 125. If the computer system determines that the particular node can be served by a sortie, the computer system may be programmed to replace the particular node with a sortie (delivery by a drone) and update the sortie tables to indicate that the particular node is to be served by a drone. Examples of one or more sortie tables include the following output tables: transportation summary table 132, sortie summary table 134, sortie details table 136, and/or sortie stops table 138. If the computer system determines that particular node cannot be served by a sortie, the computer system may be programmed to reinstate, update, or restore the particular node so that it is served by a carrier rather than a sortie.

At step 480, a computer system is programmed to repeat the selecting, removing, determining, restoring, and writing steps for a plurality of other particular nodes in the delivery route data having the service attribute specifying ground and drone delivery. In particular embodiments, the computer system is programmed to only evaluate nodes having the service attribute specifying ground and drone delivery and not the nodes having the service attribute specifying carrier only.

In particular embodiments, a computer system may be programmed to select and read from the drone definition table and the drone assignment table, and based on the delivery route data, a plurality of records associated with the particular drone. In a particular embodiment, the computer system may be further programmed to select and read from the drone transit table.

In particular embodiments, a computer system may be programmed to determine whether the particular node can be served by a sortie based on a drone's battery discharge amount associated with the distance, from a preceding node to a subsequent node, with respect to the particular node.

In particular embodiments, a computer system may be programmed to, based on the drone definition table and the drone assignment table, determine whether the drone battery discharge amount exceeds a maximum battery discharge amount of the particular drone. In particular embodiments, a computer system may be programmed to, in response to determining that the battery discharge amount exceeds the maximum battery discharge amount, restore the particular node in the delivery route data; and, otherwise, write, to the one or more sortie tables in the database, the one or more sortie records corresponding to the sortie of the particular drone that can occur between the preceding node and the subsequent node. These steps are analogous to the descriptions above with references to steps 440, 450, 460, and 470, but relates to battery capacity and battery discharge rather than flight times.

In particular embodiments, a computer system may be programmed to operate the particular drone in a sortie between the preceding node and the subsequent node based on the one or more sortie tables in the database and the one or more sortie records corresponding to the sortie.

In particular embodiments, a computer system may be programmed to generate and transmit, to a drone management system, a plurality of operating records that are configured for operating the particular drone in a sortie between the preceding node and the subsequent node based on the one or more sortie tables in the database and the one or more sortie records corresponding to the sortie.

3. Implementation Example—Hardware Overview

According to one embodiment, the techniques described herein are implemented by at least one computing device. The techniques may be implemented in whole or in part using a combination of at least one server computer and/or other computing devices coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. To accomplish the described techniques, such computing devices may combine custom hard-wired logic, ASICs, or FPGAs with custom programming. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
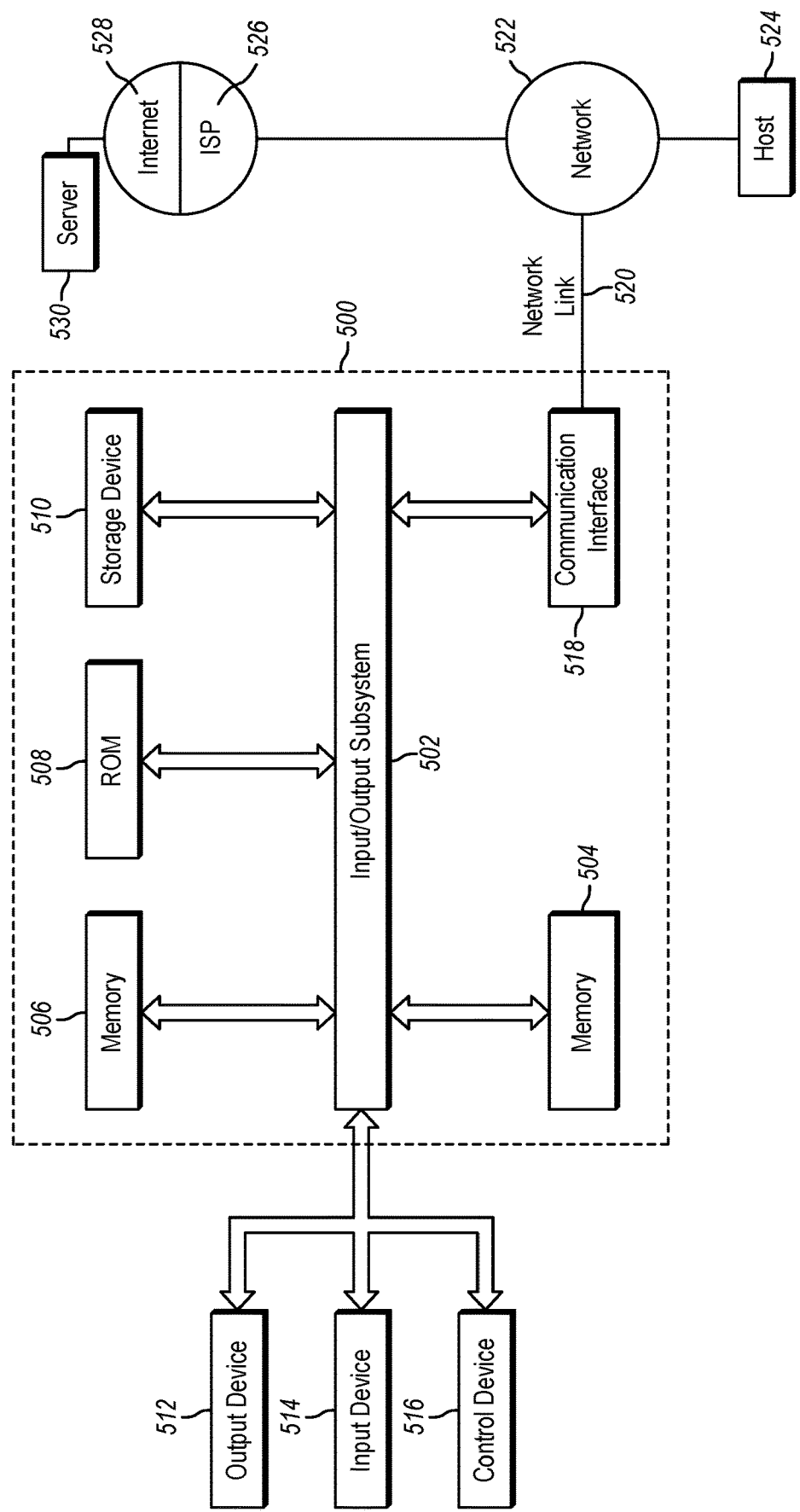
FIG. 5 illustrates a computer system with which one embodiment could be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example, as boxes and circles, at the same level of detail that is commonly used by persons of ordinary skill in the art to which this disclosure pertains for communicating about computer architecture and computer systems implementations.

Computer system 500 includes an input/output (I/O) subsystem 502, which may include a bus and/or other communication mechanism(s) for communicating information and/or instructions between the components of the computer system 500 over electronic signal paths. The I/O subsystem 502 may include an I/O controller, a memory controller, and at least one I/O port. The electronic signal paths are represented schematically in the drawings, such as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU), or a digital signal processor or ARM processor. Processor 504 may comprise an integrated arithmetic logic unit (ALU) or be coupled to a separate ALU.

Computer system 500 includes one or more units of memory 506, such as a main memory, coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during the execution of instructions to be executed by processor 504. Such instructions, when stored in non-transitory computer-readable storage media accessible to processor 504, can render computer system 500 into a special-purpose machine customized to perform the operations specified in the instructions.

Computer system 500 includes non-volatile memory such as read-only memory (ROM) 508 or other static storage devices coupled to I/O subsystem 502 for storing information and instructions for processor 504. The ROM 508 may include various forms of programmable ROM (PROM), such as erasable PROM (EPROM) or electrically erasable PROM (EEPROM). A unit of persistent storage 510 may include various forms of non-volatile RAM (NVRAM), such as FLASH memory, solid-state storage, magnetic disk, or optical disks such as CD-ROM or DVD-ROM and may be coupled to I/O subsystem 502 for storing information and instructions. Storage 510 is an example of a non-transitory computer-readable medium that may be used to store instructions and data which, when executed by the processor 504, cause performing computer-implemented methods to execute the techniques herein.

The instructions in memory 506, ROM 508, or storage 510 may comprise one or more instructions organized as modules, methods, objects, functions, routines, or calls. The instructions may be organized as one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation, application, and data storage layer, such as a relational database system using a structured query language (SQL) or no SQL, an object store, a graph database, a flat file system, or other data storage.

Computer system 500 may be coupled via I/O subsystem 502 to at least one output device 512. In one embodiment, output device 512 is a digital computer display. Examples of a display that may be used in various embodiments include a touchscreen display, a light-emitting diode (LED) display, a liquid crystal display (LCD), or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections, or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. The control device 516 may be a touchpad, a mouse, a trackball, or cursor direction keys for communicating direction information and command selections to processor 504 and for controlling cursor movement on an output device 512, such as a display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism, or other control device. An input device 514 may include a combination of multiple input devices, such as a video camera and a depth sensor.

In another embodiment, computer system 500 may comprise an Internet of Things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders, and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware, and interfaces for generating position reporting packets, notifications, pulse or heartbeat signals, or other recurring data transmissions that specify a position of the computer system 500, alone or in combination with other application-specific data, directed toward host computer 524 or server computer 530.

Computer system 500 may implement the techniques described herein using customized hard-wired logic, at least one ASIC or FPGA, firmware, and/or program instructions or logic which, when loaded and used or executed in combination with the computer system, causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media," as used herein, refers to any non-transitory media that store data and/or instructions that cause a machine to operate in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct but may be used with transmission media. Transmission media participates in transferring information between storage media. For example, transmission media includes coaxial cables, copper wire and fiber optics, and wires comprising a bus of I/O subsystem 502. Transmission media can also be acoustic or light waves generated during radio-wave and infrared data communications.

Various forms of media may carry at least one sequence of at least one instruction to processor 504 for execution. For example, the instructions may initially be carried on a remote computer's magnetic disk or solid-state drive. The remote computer can load the instructions into its dynamic memory and send them over a communication link such as a fiber optic, coaxial cable, or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to a bus or I/O subsystem 502. Communication interface 518 provides a two-way data communication coupling to a network link(s) 520 directly or indirectly connected to at least one communication network, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 522 broadly represents a local area network (LAN), wide-area network (WAN), campus network, internetwork, or any combination thereof. Communication interface 518 may comprise a LAN card to provide a data communication connection to a compatible LAN, a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic, or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may connect through network 522 to a host computer 524.

Furthermore, network link 520 may connect through network 522 or to other computing devices via internetworking devices and/or computers operated by an Internet Service Provider (ISP) 526. ISP 526 provides data communication services through a worldwide packet data communication network called Internet 528. A server computer 530 may be coupled to Internet 528. Server computer 530 broadly represents any computer, data center, virtual machine, or virtual computing instance with or without a hypervisor, or computer executing a containerized program system such as DOCKER or KUBERNETES. Server computer 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server computer 530 may form elements of a distributed computing system that includes other computers, a processing cluster, a server farm, or other organizations of computers that cooperate to perform tasks or execute applications or services. Server computer 530 may comprise one or more instructions organized as modules, methods, objects, functions, routines, or calls. The instructions may be organized as one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 530 may comprise a web application server that hosts a presentation layer, application layer, and data storage layer, such as a relational database system using a structured query language (SQL) or no SQL, an object store, a graph database, a flat file system or other data storage.

Computer system 500 can send messages and receive data and instructions, including program code, through the network(s), network link 520, and communication interface 518. In the Internet example, server computer 530 might transmit a requested code for an application program through Internet 528, ISP 526, local network 522, and communication interface 518. The received code may be executed by processor 504 as it is received and/or stored in storage 510 or other non-volatile storage for later execution.

The execution of instructions, as described in this section, may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations when a task indicates that it can be switched or on hardware interrupts. Time-sharing may be implemented to allow fast response for interactive user applications by rapidly performing context switches to provide the appearance of concurrent execution of multiple processes. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. Accordingly, the specification and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system comprising:
a database system programmed according to a table schema and storing a drone definition table that digitally stores records that defines a plurality of attributes of a plurality of drones, and a drone assignment table that digitally stores records that associate one or more of the drones identified in the drone definition table with one or more transportation assets;
one or more processors that are communicatively coupled to the database system;
one or more non-transitory computer-readable storage media that are communicatively coupled to the one or more processors storing one or more sequences of instructions which, when executed using the one or more processors, cause the one or more processors to execute:
accessing the drone definition table and the drone assignment table of the database system;
accessing digitally stored delivery route data specifying a plurality of nodes connected by edges, the nodes being ordered from a starting point to a last node, wherein each of the nodes represents a delivery location, wherein each of the nodes comprises a service attribute specifying ground-only delivery or ground and drone delivery;
evaluating a particular node having the service attribute specifying ground and drone delivery and that is next in order with respect to the starting point to determine whether the particular node is to be serviced by a particular drone using a fixed flight endurance model or a linear flight endurance model by:
selecting either the fixed flight endurance model or the linear flight endurance model for evaluating the particular node based on a more restrictive model between the fixed flight endurance model or the linear flight endurance model;
removing the particular node from the delivery route data;
determining a drone flight time associated with a distance, from a preceding node to a subsequent node, with respect to the particular node;
based on the drone definition table and the drone assignment table, determining whether the drone flight time exceeds a maximum drone flight time of the particular drone;
in response to determining that the drone flight time exceeds the maximum drone flight time, restoring the particular node in the delivery route data; and, otherwise, writing, to one or more sortie tables in the database, to indicate that a sortie corresponding to the particular node is to be serviced by the particular drone;
repeating the evaluating, restoring, and writing steps for a plurality of other particular nodes in the delivery route data having the service attribute specifying ground and drone delivery;
sending instructions configured to operate the particular drone for the sortie based on the one or more sortie tables in the database.

2. The computer system of claim 1, the one or more sequences of instructions which, when executed using the one or more processors, further cause the one or more processors to execute:
selecting and reading, from the drone definition table and the drone assignment table, and based on the delivery route data, a plurality of records associated with the particular drone.

3. The computer system of claim 1, the one or more sequences of instructions which, when executed using the one or more processors, further cause the one or more processors to execute:
determining a drone battery discharge amount associated with the distance, from a preceding node to a subsequent node, with respect to the particular node;
based on the drone definition table and the drone assignment table, determining whether the drone battery discharge amount exceeds a maximum battery discharge amount of the particular drone;
in response to determining that the battery discharge amount exceeds the maximum battery discharge amount, restoring the particular node in the delivery route data; and, otherwise, writing, to the one or more sortie tables in the database to indicate that the sortie corresponding to the particular node is to be serviced by the particular drone.

4. The computer system of claim 1, the one or more sequences of instructions which, when executed using the one or more processors, further cause the one or more processors to execute:
generating and transmitting, to a drone system, a plurality of operating records that are configured for operating the particular drone in a sortie between the preceding node and the subsequent node based on the one or more sortie tables in the database and the one or more sortie records corresponding to the sortie.

5. The computer system of claim 1, the database system further stores a drone transit table that defines transit route associated with the one or more of the drones.

6. The computer system of claim 5, the determining whether the drone flight time exceeds the maximum drone flight time of the particular drone is further based on the drone transit table.

7. A computer-implemented method, comprising:
accessing a drone definition table and a drone assignment table of a database system;
accessing digitally stored delivery route data specifying a plurality of nodes connected by edges, the nodes being ordered from a starting point to a last node, wherein each of the nodes represents a delivery location, wherein each of the nodes comprises a service attribute specifying ground-only delivery or ground and drone delivery;
evaluating a particular node having the service attribute specifying ground and drone delivery and that is next in order with respect to the starting point, to determine whether the particular node is to be serviced by a particular drone using a fixed flight endurance model or a linear flight endurance model by:
selecting either the fixed flight endurance model or the linear flight endurance model for evaluating the particular node based on a more restrictive model between the fixed flight endurance model or the linear flight endurance model;
removing the particular node from the delivery route data;
determining a drone flight time associated with a distance, from a preceding node to a subsequent node, with respect to the particular node;
based on the drone definition table and the drone assignment table, determining whether the drone flight time exceeds a maximum drone flight time of the particular drone;
in response to determining that the drone flight time exceeds the maximum drone flight time, restoring the particular node in the delivery route data; and, otherwise, writing, to one or more sortie tables in the database to indicate that a sortie corresponding to the particular node is to be serviced by the particular drone;

repeating the evaluating, restoring, and writing steps for a plurality of other particular nodes in the delivery route data having the service attribute specifying ground and drone delivery;

sending instructions configured to operate the particular drone for the sortie based on the one or more sortie tables in the database.

8. The computer-implemented method of claim 7, further comprising:

selecting and reading, from the drone definition table and the drone assignment table, and based on the delivery route data, a plurality of records associated with the particular drone.

9. The computer-implemented method of claim 7, further comprising:

determining a drone battery discharge amount associated with the distance, from a preceding node to a subsequent node, with respect to the particular node;

based on the drone definition table and the drone assignment table, determining whether the drone battery discharge amount exceeds a maximum battery discharge amount of the particular drone;

in response to determining that the battery discharge amount exceeds the maximum battery discharge amount, restoring the particular node in the delivery route data; and, otherwise, writing, to the one or more sortie tables in the database to indicate that the sortie corresponding to the particular node is to be serviced by the particular drone.

10. The computer-implemented method of claim 7, further comprising:

generating and transmitting, to a drone management system, a plurality of operating records that are configured for operating the particular drone in a sortie between the preceding node and the subsequent node based on the one or more sortie tables in the database and the one or more sortie records corresponding to the sortie.

11. The computer-implemented method of claim 7, the determining whether the drone flight time exceeds the maximum drone flight time of the particular drone is further based on a drone transit table of the database system.

12. One or more non-transitory computer-readable storage media storing one or more sequences of instructions which, when executed using one or more processors, cause the one or more processors to execute:

accessing a drone definition table and a drone assignment table of a database system;

accessing digitally stored delivery route data specifying a plurality of nodes connected by edges, the nodes being ordered from a starting point to a last node, wherein each of the nodes represents a delivery location, wherein each of the nodes comprises a service attribute specifying ground-only delivery or ground and drone delivery;

evaluating a particular node having the service attribute specifying ground and drone delivery and that is next in order with respect to the starting point to determine whether the particular node is to be serviced by a particular drone using a fixed flight endurance model or a linear flight endurance model by:

selecting either the fixed flight endurance model or the linear flight endurance model for evaluating the particular node based on a more restrictive model between the fixed flight endurance model or the linear flight endurance model;

removing the particular node from the delivery route data;

determining a drone flight time associated with a distance, from a preceding node to a subsequent node, with respect to the particular node;

based on the drone definition table and the drone assignment table, determining whether the drone flight time exceeds a maximum drone flight time of the particular drone;

in response to determining that the drone flight time exceeds the maximum drone flight time, restoring the particular node in the delivery route data; and, otherwise, writing, to one or more sortie tables in the database to indicate that a sortie corresponding to the particular node is to be serviced by the particular drone;

repeating the evaluating, restoring, and writing steps for a plurality of other particular nodes in the delivery route data having the service attribute specifying ground and drone delivery;

sending instructions configured to operate the particular drone for the sortie based on the one or more sortie tables in the database.

13. The one or more non-transitory computer-readable storage media of claim 12, the one or more sequences of instructions which, when executed using one or more processors, further cause the one or more processors to execute:

selecting and reading, from the drone definition table and the drone assignment table, and based on the delivery route data, a plurality of records associated with the particular drone.

14. The one or more non-transitory computer-readable storage media of claim 12, the one or more sequences of instructions which, when executed using one or more processors, further cause the one or more processors to execute:

determining a drone battery discharge amount associated with the distance, from a preceding node to a subsequent node, with respect to the particular node;

based on the drone definition table and the drone assignment table, determining whether the drone battery discharge amount exceeds a maximum battery discharge amount of the particular drone;

in response to determining that the battery discharge amount exceeds the maximum battery discharge amount, restoring the particular node in the delivery route data; and, otherwise, writing, to the one or more sortie tables in the database to indicate that the sortie corresponding to the particular node is to be serviced by the particular drone.

15. The one or more non-transitory computer-readable storage media of claim 12, the one or more sequences of instructions which, when executed using one or more processors, further cause the one or more processors to execute:

generating and transmitting, to a drone management system, a plurality of operating records that are configured for operating the particular drone in a sortie between the preceding node and the subsequent node based on the one or more sortie tables in the database and the one or more sortie records corresponding to the sortie.

16. The one or more non-transitory computer-readable storage media of claim 12, the one or more sequences of instructions which, when executed using one or more processors, further cause the one or more processors to execute:

accessing a drone transit table of the database system.

17. The one or more non-transitory computer-readable storage media of claim 16, the determining whether the drone flight time exceeds the maximum drone flight time of the particular drone is further based on the drone transit table.

* * * * *